United States Patent [19]
Chapman et al.

[11] 3,890,207
[45] June 17, 1975

[54] AIR AND WATER POLLUTION CONTROL

[75] Inventors: Walter H. Chapman; John F. Eichelmann, Jr., both of El Paso, Tex.

[73] Assignee: El Paso Southern Company, El Paso, Tex.

[22] Filed: Mar. 20, 1973

[21] Appl. No.: 343,178

Related U.S. Application Data

[63] Continuation-in-part of Ser. No. 87,096, Nov. 5, 1970, abandoned, which is a continuation-in-part of Ser. No. 716,222, July 15, 1971, Pat. No. 3,592,743.

[52] U.S. Cl. ................ 203/11; 55/159; 55/222; 55/316; 55/421; 159/17 VS; 159/46; 159/47 R; 159/DIG. 8; 159/DIG. 31; 202/174; 203/DIG. 8
[51] Int. Cl. ........ B01d 1/26; B01d 1/00; B01d 3/02; B01d 3/00
[58] Field of Search .... 159/46;17 R, 47 WL, 1 RW, 159/2 MS, DIG. 16, 4 A, 16 A, 17 VS; 202/173, 174; 203/10, 11, DIG. 5, DIG. 8; 55/68, 70, 71, 73; 162/30; 99/149; 261/13, DIG. 10; 23/259.3, 262, 263

[56] References Cited
UNITED STATES PATENTS

| | | | |
|---|---|---|---|
| 1,883,211 | 10/1932 | Wilson | 159/47 R |
| 2,354,175 | 7/1944 | Wilcoxson | 159/4 A UX |
| 2,385,955 | 4/1941 | Tomlinson | 23/131 |
| 2,459,302 | 1/1940 | Aronson | 159/47 WL |
| 2,524,753 | 10/1950 | Betts | 23/48 |
| 2,593,503 | 4/1952 | Tomlinson et al. | 23/48 |
| 2,635,039 | 4/1953 | Peters | 23/260 |
| 2,874,043 | 2/1953 | Lockman | 92/2 |
| 3,153,609 | 10/1964 | Markant et al. | 162/36 |
| 3,216,481 | 11/1965 | Henze | 159/DIG. 25 |
| 3,354,932 | 11/1967 | Hesler et al. | 159/17 R |
| 3,388,045 | 6/1968 | Goeldner | 202/173 |

FOREIGN PATENTS OR APPLICATIONS

| | | | |
|---|---|---|---|
| 1,092,441 | 11/1960 | Germany | 203/25 |

*Primary Examiner*—Jack Sofer
*Attorney, Agent, or Firm*—Bacon & Thomas

[57] ABSTRACT

Waste gas purification system using water scrubbers, wet filters and the like are combined with a multiple reuse of water system wherein suspended solids, absorbed volatiles and dissolved solids are economically and substantially completely removed from the waste water effluent and pure water is recovered for reuse in the gas purification process and for other purposes.

10 Claims, 1 Drawing Figure

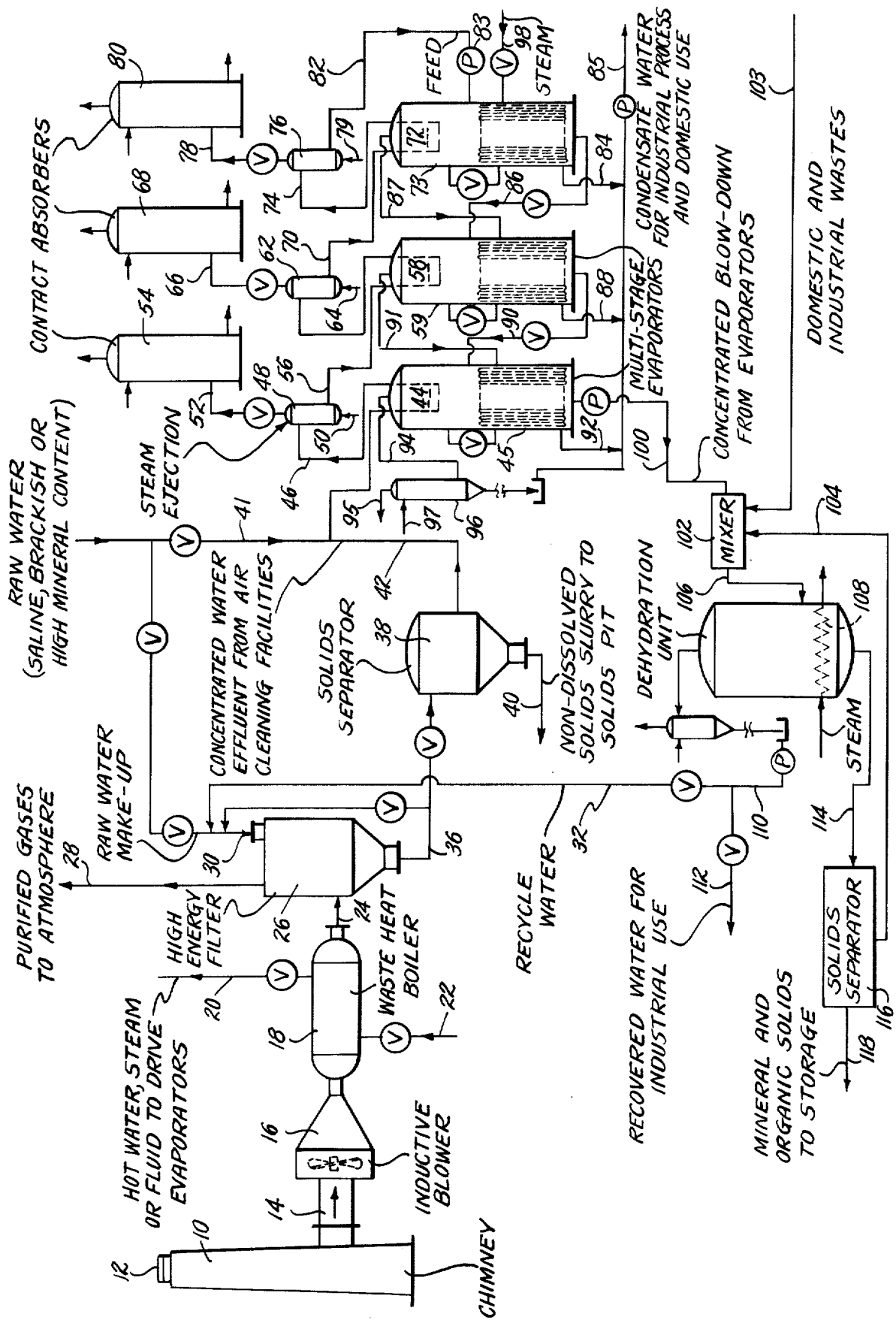

3,890,207

AIR AND WATER POLLUTION CONTROL

CROSS REFERENCE TO RELATED APPLICATION

This application is a continuation-in-part of our co-pending application Ser. No. 87,096, filed Nov. 5, 1970 now abandoned, which in turn is a continuation-in-part of application Ser. No. 716,222 filed July 15, 1971, issued as a Pat. No. 3,592,743 on July 13, 1971.

BACKGROUND OF THE INVENTION

This invention relates to a pollution control process for purification of waste gases by water treatment without creating concomitant water pollution problems. By the present process the suspended, absorbed and dissolved contaminants contained in a water effluent used to purify waste gases are effectively removed and the recovered water may be reused in the gas purification process or for other purposes.

Increasing attention has been given to environmental pollution, particularly in industrial areas, over the past several years. Major concern has been with air and water pollution control. Atmospheric pollutants cause extensive damage to buildings and crops, as well as presenting a health hazard. A large volume of atmospheric pollutants are derived from manufacturing plants, from fuel burning systems for power or heating purpose, and from domestic waste incinerators. Typical offenders are steel mills, wood pulp industries, plastics plants, mineral smelters, gypsum and cement plants, power plants, fertilizer plants, petrochemical plants and chemical plants of many varieties. Atmospheric pollutants generally comprise both particulate matter and noxious industrial gases and fumes. Notable constituents of industrial waste gases are the oxides or sulfur and nitrogen, hydrogen sulfide, carbon monoxide, organic carbon containing compounds, inorganic salts and minerals (fly ash) and carbon dioxide. Some of these, such as sulfur dioxide, present great health hazards, damaging the human respiratory system as well as plant leaves. The hydrocarbon and the nitrogen oxides are believed to be the principal precursors of photochemical smog.

Atmospheric pollutants have been removed from waste gases by a variety of known procedures. The particulate matter may be at least partially removed by means of electrostatic precipitators, mechanical dust collectors, and the like, and chemical scrubbing has been employed for removing noxious gaseous constituents. The present invention, however, relates to waste gas purification systems which use water, either alone, or in combination with other means. Extremely efficient gas-water contact devices have been developed. These include so-called high energy filters in which the gases at high velocity are contacted with water sprays or streams. For purposes of the present application the term "wet-scrubbing" is intended to apply to all gas purification systems in which the waste gas is contacted with water, whether by hydrostatic precipitators, wet dust collectors, water sprays or other means.

In the wet scrubbing system the effluent gases are brought into intimate contact with water, whereupon the particulate matter and various undesirable acidic gases are readily removed, and the harmless effluent gases are passed into the atmosphere. While wet scrubbing techniques have become extremely efficient, they require large amounts of water, especially at large industrial sites. After use in the system, the water becomes contaminated or polluted and has to be disposed of. In locations where water pollution problems are particularly severe, it becomes difficult if not impossible to dispose of this water without further aggravating the water pollution problem. Furthermore, in arid regions, it is often difficult to obtain the large supplies of fresh water necessary for use in these pollution control systems. In addition, the water that is available in these regions may already be of high mineral content thereby presenting potential corrosion problems.

SUMMARY OF THE INVENTION

The present invention provides a process for purifying industrial effluent gases which comprises contacting the gases with water to give a purified gaseous stream, which is evacuated to the atmosphere, and a water effluent containing suspended and dissolved contaminants. The suspended contaminants are separated and the resultant water effluent is freed of dissolved noxious gases and fumes and is substantially distilled to give a pure water condensate and a concentrated effluent containing dissolved solids. The concentrated water effluent is mixed with a circulating, relatively non-volatile carrier liquid, the water is evaporated therefrom and recovered as an industrial water condensate, and the precipitated solids are removed from the carrier liquid.

The present invention also concerns the above process wherein at least part of the industrial water condensate is returned and used to contact further industrial effluent gases.

The present invention also provides a process as described above wherein the industrial waste gases contain gaseous components that are dissolved or absorbed in the purifying water, and the water effluent containing these gases is subjected to a desorption step prior to distillation.

In general process of the present invention, when the industrial gases are at an elevated temperature, they are passed through a waste heat boiler prior to contact with the purifying water and the heat recovered therefrom can be utilized in at least one of the evaporation steps.

The herein described process is particularly well adapted for use with the multiple reuse of water systems described in out U.S. Pat. No. 3,592,743, and together therewith provide a total pollution control system particularly adapted for simultaneous use at industrial and domestic sites.

BRIEF DESCRIPTION OF THE DRAWING

The invention is further described in connection with the attached drawing, which is a schematic flow diagram of a typical installation in use with a conventional industrial plant.

DETAILED DESCRIPTION OF THE INVENTION

The present invention comprises a process for the purification of industrial effluent gases by means of water scrubbers, wet dust collectors and the like, wherein the scrubber water, rather than being discarded and thereby creating another pollution problem, is itself purified and reused for industrial and domestic purposes.

In a representative embodiment, industrial effluent gases (stack gases) containing solid particulate matter, such as fly ash, and noxious gases such as the oxides of sulfur and nitrogen (sour gases) are first pre-cooled in order to ensure that the noxious gases will be absorbed by the water scrubbers. The stack or effluent gases can be pre-cooled by passing them through a conventional heat exchange apparatus. The heat exchange fluid, e.g., water or steam, can then be used to heat the multistage evaporator used in the process. After being cooled, the effluent gases are passed into a water scrubber, wet dust collector, or a combination thereof.

Various commercial wet dust collectors and scrubbers can be used in the process of the present invention, such as those manufactured by the American Air Filter Company, Inc., of Louisville, Ky. and the Western Precipitation Division of the Joy Manufacturing Company, Los Angeles, Calif. The water used in these systems can be recirculated with make-up water being added to take care of evaporation, until it reaches its load limit with respect to impurities. At least a portion of such spent water must then be purged from the system. If discharged into drainage systems an obvious pollution problem is presented. It is an object of this invention to provide a process for repurifying and reusing such water as part of a total pollution control system.

A particularly desirable gas-purification system comprises the use of a high energy wet filter, such as the American Air Filter Company "Kinpactor" kinetic scrubber, or a cyclonic type wet separator or a combination thereof. The high energy wet filters utilize kinetic energy to accomplish dust and fume collection. Water is injected in the collection chamber under high pressure in sheets through a venturi throat, thereby effecting an extremely efficient entrapment of pollutants. The aqueous slurry from the wet filter, containing suspended absorbed and dissolved impurities, is passed into a solids separator where most of the non-dissolved solids are separated from the water. The separated solids (fly-ash) can be disposed of in a solid pit or put to practical use, for example in the preparation of cinder building blocks.

The water effluent, which now contains primarily dissolved solids and gases, is preferably heated by passage in indirect heat exchange relation through preheat zones of a series of multi-stage evaporators over an increasing temperature gradient. As the heated effluent is exited from each evaporator, it is subjected to stem ejection to expel absorbed or dissolved volatile constituents from the effluent water, which are collected by any suitable means, i.e, condenser, chemical absorbers or the like.

The heated water effluent, free of volatile contaminants, is distilled by passage through a series of water distillation units of the multi-stage evaporator system, and the pure distilled water is collected and made available for domestic and industrial use. While the invention is not limited thereto, conventional, forward-feed or backward feed multiple-effect evaporator systems of three or more stages may be used. See "Elements of Chemical Engineering" by Badger and McCabe, McGraw-Hill Book Company, Inc. (2nd Ed., 1936) pages 215 to 229. Falling film type multiple evaporator systems such as shown in Henderson U.S. Pat. No. 3,414,483 are also quite useful in this invention.

The blow-down water from the evaporators, concentrated in dissolved solid components, is then treated to remove solid components so that the water may be reused. For example, it is passed into a Carver-Greenfield dehydration system, such as that described in U.S. Re. No. 26,317, U.S. Re. No. 26,352 and U.S. Pat. No. 3,323,575, which may also receive other industrial and domestic waste waters. In the Carver-Greenfield system, the industrial and domestic waste water, e.g., sewage sludge, and the blow-down water are mixed with a fluidizing oil to give a pumpable-slurry, and the total mixture is subjected to evaporative dehydration. The water vapors are condensed and the recovered water re-utilized for industrial use, for example in the high energy filtering system referred to above. The remaining solids and residual oils are separated and the recovered oil recycled. The separated solids, which are generally high in organic content, can be burned for fuel, used for land-fill and fertilizer, or stored in waste pits.

It is essential for the operation of this dehydration process that after mixing the oil and water-waste, the mixture remains fluid and pumpable even after the removal of most of the water. The oils which are used in this dehydration system are reaction inert, relatively non-volatile oils or fats, or oil-like materials such as the silicon oils. It will be understood that the word "oil" is used in a very broad sense and is not limited to hydrocarbon and other conventional materials well-recognized as oils. The word oil as used herein signifies any relatively non-volatile fluidizing liquid. Typical examples are high-boiling petroleum fractions such as fuel oils.

The nature and scope of this invention, as well as its objects and advantages, will be more fully appreciated and understood by referring to the accompanying drawing which illustrates a representative but non-limiting embodiment.

The chimmey 10 of an industrial power plant is fitted with a removable stack seal 12. The stack effluent gases, comprising particulate matter (fly-ash) and gases such as CO, $CO_2$, $SO_2$, nitrogen oxides, $H_2S$ and various mercaptans, pass through pipe 14 into an inductive blower 16. The latter eliminates back pressure due to the pressure drop and provides the necessary pressure to froce the gases through the wet cleaning system. The stack gases, which in this instance have a temperature above about 500°F, generally about 700°–800°F, are cooled by passing them into the waste heat boiler 18. Water, or other cooling fluid or heat transfer agent, passes into boiler 18 through line 22, and the resultant hot water, steam or heated fluid is exited at line 20 and may be used to heat the dehydration unit or evaporators used in the system. The cooled effluent gases, which are now below about 200°F, are passed through the exit pipe 24 and into a high energy water filter or scrubber 26. Purified gases are vented to the atmosphere through vent pipe 28. The water used in the scrubber enters at water inlet 30. Either potable water, recycle water, or raw water obtainable from a typical source of saline or brackish water can be used. Typically, the raw water can contain up to about 1,000 parts per million dissolved solids. If the source of raw water contains a mineral content higher than this level, it can be blended by mixing it with recycled industrial water from recycle line 32 which is of relatively low mineral content. Water obtained from this source generally contains no more than about 15–20 parts per million dissolved solids.

The effluent water from unit 26 containing suspended particulate matter, absorbed gases and dissolved solids is passed through the pipe 36 to the solids separator or centrifuge 38 where the suspended particulate portion (mainly fly-ash) is withdrawn as a thick slurry by exit pipe 40. As mentioned above, this fly-ash may find use for various applications such as in the preparation of cinder blocks. The water effluent from separator 38, containing dissolved solids and absorbed gases such as $SO_2$, is delivered through line 42 to preheating zones of multiple effect evaporators 45, 59 and 73. Any conventional multiple effect evaporators may be modified to include such preheating zones. The waste water in line 42 can also be optionally mixed with additional saline, brackish water or water of high mineral content by adding such water through line 41.

The water from line 42 is passed in series flow through heat exchanger or preheat zones 44, 58 and 72 contained within evaporator units 45, 59 and 73, respectively, of the multiple effect evaporator system, and through steam ejection degassers 48, 62 and 76 wherein selective flashing of the absorbed gases occurs.

In a representative operation, the effluent water from the solids separator 38 is transmitted by line 42, optionally mixed with raw water from line 41, into heat exchange zone 44 in the evaporator 45. The water is heated to about 90°–100°F and directed by line 46 to the steam ejection unit 48. Steam is directed into the unit by means of inlet 50 and is passed through the heated effluent mixture whereupon various absorbed gases, such as $SO_2$, are driven out of the water mixture and carried by line 52 to the contact absorption tower 54, where they are absorbed. The expelled gases can be collected by contacting them with suitable absorbent liquids appropriately selected for the particular constituent to be absorbed.

The effluent water then passes by way of line 56 into the heat exchange zone 58 contained in the distillation unit 59 where it is heated to a higher temperature, e.g., about 100°–150°F. The heated effluent water is then passed to an additional steam ejection unit 62. Again steam is passed into the unit by means of inlet 64 and another fraction of dissolved gases are displaced and expelled from the effluent water. The expelled gases pass through exit line 66 into the contact absorption tower 68.

The effluent water is heated to a still higher temperature (ca. 150°–200°F) by directing it by means of line 70 into the heat exchange zone 72 in the distillation unit 73, which is the first distillation unit of the forward feed system shown. The heated effluent water is conducted by line 74 into the steam ejection unit 76 and once again steam is conducted into the effluent water through inlet 79. The remaining dissolved gases and fumes are driven through line 78 into the contact absorption tower where they are removed.

It should be understood that while a 3-stage evaporation and heat exchange system is shown, this number is not critical and a greater or lesser number of units can be employed depending upon the particular pollution problem under consideration. Typically, the temperature gradients over the three units of the evaporator system shown may range from 250°F in unit 73 to 215°F in unit 45. However, the temperature gradient over both preheat zones and distillation zones can be adjusted to best suit the volume and nature of the impure input water.

The heated effluent water in line 82, now freed of particulate matter and dissolved gases and noxious fumes, is pumped into the distillation units of the multiple effect evaporation system and distilled. The condensate water from each unit is available for domestic and industrial purposes, and the concentrated blowdown is passed into the Carver-Greenfield dehydration system or other treating system as previously described.

Referring to the attached drawing, the heated effluent water passes, by way of line 82 and pump 83, into the distillation unit 73 and is partially evaporated. Heat for this unit is supplied by steam through line 98. Steam-condensate water is collected and delivered by means of line 84 to the main condensate collection line 85. The concentrated effluent is passed through line 86 into the distillation unit 59 where it is again subjected to distillation, heat being supplied by vapors from line 87 and condensate water being collected and directed to the main collection line 85 by means of line 88. The further concentrated effluent from unit 59 is passed through line 90 to final distillation unit 45. The distillation is continued with heat supplied by vapors from line 91 and the condensate water being collected and directed by line 92 to the collection line 85. Vapors from final unit 45 pass through line 94 where moisture is condensed by contact with pure water entering condenser 96 through line 97. Pure water effluent from the condenser 96 passes through line 99 into condensate water line 85. Uncondensed gases, substantially free of contaminants, leave the system through line 95. Again, it should be pointed out that while three distillation units are shown, more or less than this number can be used depending upon the particular industrial circumstances.

The highly concentrated blow-down water from unit 45 is now collected and directed by line 100 into a mixing tank 102 comprising part of a so-called Carver-Greenfield system, such as that illustrated in the aforementioned patents (U.S. Re. No. 26,317, Re. No. 26,352 and U.S. Pat. No. 3,323,575). The mixing tank 102 may also receive domestic and industrial wastes such as raw sewage, garbage and the like, through the line 103. The combined waste waters are mixed with reclaimed fluidizing oil, which is recirculated through line 104 into the mixing tank 102. The resultant fluidized slurry mixture is introduced by means of line 106 into the dehydration unit 108 of the Carver-Greenfield system. In this unit substantially all the water is removed leaving the solids suspended in the non-volatile fluidizing oil.

The condensate water is withdrawn through line 110 and made available for various uses. Thus, it can be recycled through line 32 and reused in the high-energy filter 26. Alternatively, it can be diverted through line 112 for other industrial uses. Because of its low mineral content (ca. 15–20 parts per million or less dissolved solids) it can be used for irrigation purposes.

The remaining dehydrated material, consisting of solids suspended in oil, is withdrawn through line 114 to a solids separator 116 which may be a centrifuge or the like. The reclaimed oil is recycled back into the system through line 104 to the mixing tank as described above, and the solids are withdrawn through line 118. The solids can be stored for commercial use, used for fuel or fertilizer, or sent to a waste pit.

While the discussion above was related to a coal or oil burining industrial power plant, the process of the present invention can be used with a variety of industrial plants, such as a natural gas pumping station; a natural gas-heating plant; a chemical plant, refinery, pulp mill, cement plant, copper smelting plant, and the like.

Where the volume of absorbed gases in the water effluent from the water scrubbing system is low or where these gases are not a noxious character, the steam ejection units 48, 62, 76 and contact absorbers 54, 68, 80 may be omitted. Instead, the pre-heat zones would be used simply for preheating the water prior to entry into the distillation units. The rest of the process would be as described above.

The process of the present invention is also effectively employed in plants concerned with the processing of copper ores. Most of the copper used today is obtained by the well-known methods or roasting and reducing copper sulfide ores. In these processes, considerable amounts of sulfur dioxide and particulate matter are generated. Accordingly, when the chimney 10 is part of such a smelting plant, the sulfur dioxide and particulate matter are entrapped in the high energy filter 26. The particulate matter is released through line 40 and the sulfur dioxide collected in the contact absorbers 54, 68 and 80, as previously described.

One of the outstanding features of the present invention, which is readily apparent from the above description, is the fact that it can provide total pollution control for communities having both industrial and residential areas in close proximity, simultaneously effecting both air pollution and water pollution control in such locations.

We claim:

1. In a process for pollution control wherein waste gases containing solid and gaseous contaminants are purified by direct contact with water to provide a purified gaseous stream for evacuation to the atmosphere and a water effluent containing dissolved or absorbed gaseous contaminants and suspended and dissolved solid contaminants, the improvement comprising preventing water pollution and conserving water by: separating the suspended contaminants from said water effluent subjecting the resulting water to a desorption step to remove gaseous contaminants after first preheating same, collecting the removed gaseous contaminants, distilling the resulting water to provide a pure water condensate and a blow-down water concentrated in solids content, removing solids from the blow-down water to provide water suitable for industrial use, and returning at least part of said water suitable for industrial use to contact further waste gases.

2. In a process for pollution control wherein waste gases containing solid and gaseous contaminants including gaseous sulfur compounds are purified by direct contact with water to provide a purified gaseous stream for evacuation to the atmosphere and a water effluent containing dissolved or absorbed gaseous contaminants and suspended and dissolved solid contaminants, the improvement comprising preventing water pollution by: separating the suspended contaminants from said water effluent, subjecting the resulting water to a desorption step to remove gaseous contaminants including said gaseous sulfur compounds after first preheating same, collecting said gaseous contaminants including said gaseous sulfur components, distilling the resulting water to provide a pure water condensate and blow-down water concentrated in solids content, and removing solids from the blow-down water to provide water suitable for industrial use.

3. In a process for pollution control wherein waste gases are purified by contact with water to provide a purified gaseous stream for evacuation to the atmosphere and a water effluent containing dissolving solids and dissolved and absorbed gaseous contaminants, the improvement comprising preventing water and air pollution and recovering usable water by subjecting all of said water effluent to distillation in evaporation apparatus having a preheat zone and a distillation zone to provide a usable pure water condensate and a solids concentrate, removing gaseous contaminants from said water effluent in a degassing step following said preheat zone and prior to the introduction of the water effluent into the water distillation zone, recovering said removed gaseous contaminants to prevent atmospheric pollution, and separating solids from said solids concentrate to provide usable water.

4. The process of claim 3 wherein said water effluent is subjected to distillation in multi-stage evaporator apparatus, each stage having a preheat zone and a distillation zone, the water effluent is passed sequentially through the preheat zones prior to entering the distillation zones and its temperature increased in each preheat zone, the heated water is subjected to a degassing step following each preheat zone, and the desorbed gases are separately collected and recovered.

5. In a process for pollution control wherein waste gases containing solid and gaseous contaminants are purified by direct contact with water to provide gaseous stream for evacuation to the atmosphere and a water effluent containing dissolved or absorbed gaseous contaminants and suspended and dissolved contaminants, the improvement comprising preventing water pollution and recovering usable water by: separating the suspended contaminants from said water effluent, subjecting the resulting water to a desorption step to remove gaseous contaminants after first preheating same, recovering said removed gaseous contaminants to prevent atmospheric pollution, distilling the resulting water to provide a pure water condensate and a blow-down water concentrated in solids content, and removing solids from the blow-down water to provide water suitable for industrial use.

6. The process of claim 5 wherein the suspended contaminants are separated by centrifugation.

7. In a process for pollution control wherein hot waste gases containing solid and gaseous contaminants are passed through a waste heat boiler and are then purified by direct contact with water to provide a purified gaseous stream for evacuation to the atmosphere and a water effluent containing dissolved or absorbed gaseous contaminants and suspended and dissolved contaminants, the improvement comprising preventing water pollution by: separating the suspended contaminants from said water effluent, subjecting the resulting water to a desorption step to remove gaseous contaminants after first preheating same, collecting the removed gaseous contaminants, distilling the resulting water to provide a pure water condensate and a blow-down water concentrated in solids content, removing solids from the blow-down water to provide water suitable for industrial use, and utilizing heat recovered in said waste heat boiler to provide heat for said distillation.

8. The process of claim 7 wherein the gases are waste stack gases at a temperature above 500°F and are cooled in the waste heat boiler to a temperature below about 200°F prior to contact with the purifying water.

9. In process for pollution control wherein waste gases containing solid and gaseous contaminants are purified by direct contact with water to provide a purified gaseous stream for evacuation to the atmosphere and a water effluent containing dissolved or absorbed gaseous contaminants and suspended and dissolved solid contaminants, the improvement comprising preventing water pollution by: separating the suspended contaminants from said water effluent, passing the resuling water through a preheat zone of a water distillation unit, removing gaseous components from the preheated water, collecting said removed gaseous components to prevent atmospheric pollution, passing the resulting water into the water distillation zone of said distillation unit and distilling it to provide a pure water condensate and a blow-down water concentrated in solids content, and removing solids from the blow-down water to provide water suitable for industrial use.

10. The process of claim 9 wherein a multi-stage water distillation is employed, the water containing dissolved or absorbed gases is passed sequentially through a said preheat zone in each distillation stage prior to entering into the distillation zones and its temperature is increased in each preheat zone, and dissolved gaseous components are removed after passage through each preheat zone.

* * * * *